(12) United States Patent
Tan

(10) Patent No.: US 12,189,927 B2
(45) Date of Patent: Jan. 7, 2025

(54) INFORMATION PRESENTATION METHOD AND APPARATUS, AND COMPUTER STORAGE MEDIUM

(71) Applicant: BEIJING BYTEDANCE NETWORK TECHNOLOGY CO., LTD., Beijing (CN)

(72) Inventor: Yifan Tan, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/256,631

(22) PCT Filed: Jan. 19, 2022

(86) PCT No.: PCT/CN2022/072626
§ 371 (c)(1),
(2) Date: Jun. 8, 2023

(87) PCT Pub. No.: WO2022/166579
PCT Pub. Date: Aug. 11, 2022

(65) Prior Publication Data
US 2024/0019989 A1    Jan. 18, 2024

(30) Foreign Application Priority Data
Feb. 5, 2021   (CN) .......................... 202110163449.X

(51) Int. Cl.
*G06F 16/9538*    (2019.01)
*G06F 3/0482*    (2013.01)
(Continued)

(52) U.S. Cl.
CPC .......... *G06F 3/0483* (2013.01); *G06F 3/0482* (2013.01); *G06F 3/0484* (2013.01);
(Continued)

(58) Field of Classification Search
CPC .... G06F 3/0483; G06F 3/0482; G06F 3/0484; G06F 16/9538; G06F 40/134; G06F 40/109; G06F 2203/04804
See application file for complete search history.

(56) References Cited

U.S. PATENT DOCUMENTS

2015/0032509 A1    1/2015  Fuentes et al.
2021/0382905 A1*  12/2021  Zimmerman ......... G06F 3/0482

FOREIGN PATENT DOCUMENTS

CN            105117418 A         12/2015
CN            106202155 A    *    12/2016
(Continued)

OTHER PUBLICATIONS

Frederico Araujo Durao et al., A Linked Data Browser with Recommendations, Nov. 1, 2018, IEEE 30th International Conference on Tools with Artificial Intelligence, pp. 189-196 (Year: 2018).*

(Continued)

*Primary Examiner* — Tam T Tran
(74) *Attorney, Agent, or Firm* — Alleman Hall & Tuttle LLP

(57) ABSTRACT

The present disclosure relates to an information presentation method, apparatus and computer storage medium, wherein the method comprises: presenting at least one piece of interactive content on a first page, wherein the interactive content comprises at least one target text element presented in a preset form, and the preset form is used for indicating acquisition of an associated resource of the target text element; in response to a trigger operation on the target text element, acquiring a first introduction information of a first resource matching the target text element and a second introduction information of a second resource related to the
(Continued)

target text element; and presenting the first introduction information and the second introduction information on a second page.

20 Claims, 9 Drawing Sheets

(51) Int. Cl.
    *G06F 3/0483*     (2013.01)
    *G06F 3/0484*     (2022.01)
    *G06F 40/109*     (2020.01)
    *G06F 40/134*     (2020.01)

(52) U.S. Cl.
    CPC ........ *G06F 16/9538* (2019.01); *G06F 40/109* (2020.01); *G06F 40/134* (2020.01); *G06F 2203/04803* (2013.01)

(56) References Cited

FOREIGN PATENT DOCUMENTS

| CN | 107341159 A | * | 11/2017 | ........... G06F 16/955 |
|---|---|---|---|---|
| CN | 110968765 A | | 4/2020 | |
| CN | 111191112 A | * | 5/2020 | |
| CN | 111859204 A | | 10/2020 | |
| CN | 112257388 A | * | 1/2021 | |
| CN | 112799561 A | | 5/2021 | |

OTHER PUBLICATIONS

Kartik Chandra Jena et al., Principles—Technique and Evaluation of Recommendation Systems, Jan. 1, 2017, International Conference on Inventive Systems and Control, pp. 1-6 (Year: 2017).*
China National Intellectual Property Administration, Office Action and Search Report Issued in Application No. 202110163449.X, Jul. 13, 2022, 19 pages.
China National Intellectual Property Administration, Office Action and Search Report Issued in Application No. 202110163449.X, Dec. 24, 2021, 31 pages.
ISA China National Intellectual Property Administration, International Search Report and Written Opinion Issued in Application No. PCT/CN2022/072626, Apr. 19, 2022, WIPO, 10 pages.
China National Intellectual Property Administration, Office Action and Search Report Issued in Application No. 202110163449.X, Dec. 21, 2022, 8 pages.

* cited by examiner

INFORMATION PRESENTATION METHOD AND APPARATUS, AND COMPUTER STORAGE MEDIUM

CROSS-REFERENCE OF RELATED APPLICATION

The present application is a national phase application of PCT/CN2022/072626 filed Jan. 19, 2022 which claims the priority of a Chinese patent application No. 202110163449.X filed on Feb. 5, 2021_entitled "INFORMATION PRESENTATION METHOD AND APPARATUS, AND COMPUTER STORAGE MEDIUM", which is hereby incorporated by reference in its entirety.

FIELD OF THE INVENTION

The present disclosure relates to the technical field of internet technology, and in particular, to an information presentation method and apparatus, and a computer storage medium.

BACKGROUND

With the development of internet technology, there are more and more software for meeting entertainment requirements of users, and currently, there are a function of sharing and communicating information among users in many software, for example, community communication software, E-book reading software, etc., and general users may publish contents in the community communication software or E-book reading software, and share their own lives.

When a user watches the contents shared by other users through the community comment software or the E-book reading software, the user can only perform operations, such as commenting, forwarding, liking, collection and so on, on the shared contents, and the interaction manners are relatively simple; and if the user wants to know other contents related to the shared contents, the user needs to conduct search for the contents, the operation would be cumbersome and time consuming, and the efficiency of acquiring the information is low.

DISCLOSURE OF THE INVENTION

Embodiments of the present disclosure at least provide an information presentation method and apparatus, and a computer storage medium.

In a first aspect, there is provided an information presentation method, comprising:
  presenting at least one piece of interactive content on a first page, wherein the interactive content comprises at least one target text element presented in a preset form, and the preset form is used for indicating acquisition of an associated resource of the target text element;
  in response to a trigger operation on the target text element, acquiring a first introduction information of a first resource matching the target text element and a second introduction information of a second resource related to the target text element; and
  presenting the first introduction information and the second introduction information on a second page.

In some embodiments of the present disclosure, the preset form comprises at least one of Specific Font Color, Specific Background Color, Underline, Font Bold, and Character Amplification, and the preset form of target text element is configured with an inner chain, which is used for linking to a second page presenting the first introduction information and the second introduction information.

In some embodiments of the present disclosure, title information of the first resource comprises at least one keyword in the target text element, and
  the second resource has the same attribute information as the target text element in at least one preset attribute dimension, and/or co-occurrence data of title information of the second resource and the target text element in historical interactive contents exceeds a preset threshold.

In some embodiments of the present disclosure, the presenting the first introduction information and the second introduction information on a second page comprises:
  on the second page, presenting the first introduction information and the second introduction information in different presentation manners respectively.

In some embodiments of the present disclosure, the first resource comprises a plurality of resources, and the second resource comprises a plurality of resources, and the presenting the first introduction information and the second introduction information in different presentation manners respectively, comprising:
  respectively presenting the first introduction information of each of the first resources in a first area of the second page in a vertically arrangement,
  respectively presenting the second introduction information of each of the second resources in a second area of the second page in a lateral arrangement, wherein the second introduction information supports lateral switching presentation.

In some embodiments of the present disclosure, the first resource comprises a plurality of resources, and the second resource comprises a plurality of resources, and the presenting the first introduction information and the second introduction information in different presentation manners respectively, comprising:
  presenting the second page in form of a floating layer,
  a first area of the second page comprises a plurality of first cards, the number of the first cards matches with the number of the first resources, and the first introduction information is presented in respective first cards respectively; and
  a second area of the second page comprises a second card, and a plurality of pieces of the second introduction information are presented in the second card.

In some embodiments of the present disclosure, the associated resource is a book, the target text element is a book name, and the first introduction information and the second introduction information are introduction information of the book.

In some embodiments of the present disclosure, the method further comprises after the presenting the first introduction information and the second introduction information on a second page,
  in response to a trigger operation for any presented book introduction information, presenting a reading page of a book corresponding to any presented book introduction information.

In some embodiments of the present disclosure, the method further comprising:
  presenting a search entry of the target text element in a third area of the second page;
  acquiring a search result corresponding to the target text element in response to a trigger operation on the search entry; and
  presenting the search result on a third page.

In some embodiments of the present disclosure, the first page, the second page, and the third page are pages of the same application.

In a second aspect, there is provided an information presentation method, comprising:
  identifying at least one target text element in an interactive content,
  processing a display form of the target text element in the interactive content to a present form and then sending the target text element to a client, wherein the preset form is used for indicating acquisition of an associated resource of the target text element;
  when it is determined that any target text element in the interactive content is triggered, sending a first introduction information of a first resource matching the any target text element and a second introduction information of a second resource related to the any target text element to the client for presentation.

In some embodiments of the present disclosure, the identifying at least one target text element in an interactive content, comprises:
  identifying a preset identifier in the interactive content; and
  determining the target text element in the interactive content based on location of the identified preset identifier.

In some embodiments of the present disclosure, the first introduction information of a first resource matching the any target text element and the second introduction information of a second resource related to the any target text element are determined by:
  determining the first resource matching any target text element, and the second resource related to the any target text element,
  extracting target key information from the first resource and the second resource respectively as the first introduction information and the second introduction information, wherein the target key information comprises at least one of a picture, a title, and a brief introduction.

In some embodiments of the present disclosure, the determining the first resource matching the any target text element comprises:
  determining an editing distance between target key information of a candidate resource and the any target text element, based on each character in the any target text element and each character in the target key information of the candidate resource; and
  taking a candidate resource with a corresponding editing distance that is less than a set value as the first resource.

In some embodiments of the present disclosure, the determining the second resource matching the any target text element comprises:
  determining a candidate resource having the same attribute information as the target text element in at least one preset attribute dimension as the second resource, and/or
  acquiring co-occurrence data of title information of candidate resources and the target text element in historical interactive contents, and selecting a candidate resource with a corresponding co-occurrence data that exceeds a preset threshold as the second resource.

In a third aspect, there is provided an information presentation apparatus, comprising:
  a first presentation module configured to present at least one piece of interactive content on a first page, wherein the interactive content comprises at least one target text element presented in a preset form, and the preset form is used for indicating acquisition of an associated resource of the target text element;
  a first acquisition module configured to, in response to a trigger operation on the target text element, acquire a first introduction information of a first resource matching the target text element and a second introduction information of a second resource related to the target text element; and
  a second presentation module configured to present the first introduction information and the second introduction information on a second page.

In some embodiments of the present disclosure, the preset form comprises at least one of Specific Font Color, Specific Background Color, Underline, Font Bold, and Character Amplification, and the preset form of target text element is configured with an inner chain, which is used for linking to a second page presenting the first introduction information and the second introduction information.

In some embodiments of the present disclosure, title information of the first resource comprises at least one keyword in the target text element, and
  the second resource has the same attribute information as the target text element in at least one preset attribute dimension, and/or co-occurrence data of title information of the second resource and the target text element in historical interactive contents exceeds a preset threshold.

In some embodiments of the present disclosure, the second presentation module is specifically configured to, on the second page, present the first introduction information and the second introduction information in different presentation manners respectively.

In some embodiments of the present disclosure, the first resource comprises a plurality of resources, and the second resource comprises a plurality of resources, and the second presentation module is specifically configured to:
  respectively present the first introduction information of each of the first resources in a first area of the second page in a vertically arrangement,
  respectively present the second introduction information of each of the second resources in a second area of the second page in a lateral arrangement, wherein the second introduction information supports lateral switching presentation.

In some embodiments of the present disclosure, the first resource comprises a plurality of resources, and the second resource comprises a plurality of resources, and the second presentation module is specifically configured to present the second page in form of a floating layer,
  a first area of the second page comprises a plurality of first cards, the number of the first cards matches with the number of the first resources, and the first introduction information is presented in respective first cards respectively; and
  a second area of the second page comprises a second card, and a plurality of pieces of the second introduction information are presented in the second card.

In some embodiments of the present disclosure, the associated resource is a book, the target text element is a book name, and the first introduction information and the second introduction information are introduction information of the book.

In some embodiments of the present disclosure, the apparatus further comprises a third presentation module configured to, in response to a trigger operation for any presented book introduction information, present a reading page of a book corresponding to any presented book introduction information.

In some embodiments of the present disclosure, the second presentation module is specifically configured to present a search entry of the target text element in a third area of the second page; acquire a search result corresponding to the target text element in response to a trigger operation on the search entry; and present the search result on a third page.

In some embodiments of the present disclosure, the first page, the second page, and the third page are pages of the same application.

In a fourth aspect, there is provided an information presentation apparatus, comprising:

an identification module configured to identify at least one target text element in an interactive content, a processing module configured to process a display form of the target text element in the interactive content to a present form and then send the target text element to a client, wherein the preset form is used for indicating acquisition of an associated resource of the target text element;

a push module configured to, when it is determined that any target text element in the interactive content is triggered, send a first introduction information of a first resource matching the any target text element and a second introduction information of a second resource related to the any target text element to the client for presentation.

In some embodiments of the present disclosure, the identification module is specifically configured to:

identify a preset identifier in the interactive content; and
determine the target text element in the interactive content based on location of the identified preset identifier.

In some embodiments of the present disclosure, the apparatus further comprises a determination module is specifically configured to:

determine the first resource matching any target text element, and the second resource related to the any target text element, extract target key information from the first resource and the second resource respectively as the first introduction information and the second introduction information, wherein the target key information comprises at least one of a picture, a title, and a brief introduction.

In some embodiments of the present disclosure, the determination module is specifically configured to:

determine an editing distance between target key information of a candidate resource and the any target text element, based on each character in the any target text element and each character in the target key information of the candidate resource; and take a candidate resource with a corresponding editing distance that is less than a set value as the first resource.

In some embodiments of the present disclosure, the determination module is specifically configured to:

determine a candidate resource having the same attribute information as the target text element in at least one preset attribute dimension as the second resource, and/or acquire co-occurrence data of title information of candidate resources and the target text element in historical interactive contents, and select a candidate resource with a corresponding co-occurrence data that exceeds a preset threshold as the second resource.

According to a fifth aspect, an optional implementation of the present disclosure further provides a computing device, comprising a processor, and a memory, wherein the memory stores machine-readable instructions executable by the processor, the processor is configured to execute the machine-readable instructions stored in the memory, and the machine-readable instructions, when executed by the processor, cause executed of the steps in the first aspect or any possible implementation of the first aspect, or the steps in the second aspect or any possible implementation of the second aspect.

According to a sixth aspect, an optional implementation of the present disclosure further provides a computer-readable storage medium storing a computer program thereon, and the computer program, when running, causes executed of the steps in the first aspect or any possible implementation of the first aspect, or the steps in the second aspect or any possible implementation of the second aspect.

According to a seventh aspect, an embodiment of the present disclosure further provides a computer program product carrying program codes, wherein instructions included in the program codes, when executed by a computer, cause the computer to implement the method steps in the first aspect or any possible implementation of the first aspect, or the method steps in the second aspect or any possible implementation of the second aspect.

In order to make the above objects, features, and advantages of the present disclosure more obvious and understandable, some preferable embodiments will be enumerated and described in detail below with reference to the accompanying drawings hereinafter.

DESCRIPTION OF THE DRAWINGS

In order to more clearly illustrate the technical solutions of embodiments of the present disclosure, the accompanying drawings that need to be used in the embodiments are briefly described below, and the drawings herein are incorporated in and constitute a part of this specification, and these drawings illustrate some embodiments according to the present disclosure, and together with the description, serve to explain the technical solutions of the present disclosure. It should be understood that the following drawings illustrate only certain embodiments of the present disclosure, and therefore should not be considered as limiting the scope of the present disclosure, and for those skilled in the art, other related drawings may be obtained according to these drawings without involving any inventive effort.

DETAILED DESCRIPTION OF PREFERRED EMBODIMENTS

Figure 1:
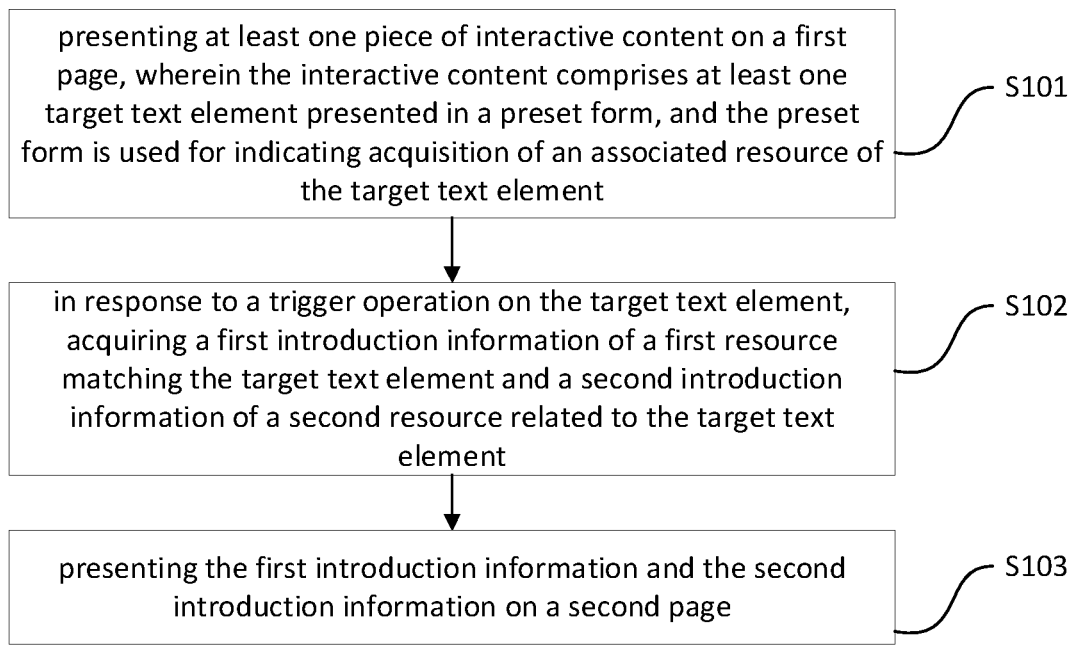
FIG. 1 shows a flowchart of an information presentation method according to an embodiment of the present disclosure.

In order to make the objectives, technical solutions and advantages of the embodiments of the present disclosure clearer, the technical solutions in the embodiments of the present disclosure will be clearly and completely described below in conjunction with the drawings in the embodiments of the present disclosure. It is obvious that the described embodiments are only a part of the embodiments of the present disclosure, instead of all the embodiments. Generally, the components of embodiments of the present disclosure described and illustrated herein may be arranged and designed in a variety of different configurations. Therefore, the following detailed description of embodiments of the present disclosure is not intended to limit the scope of the disclosure as claimed, but merely represents selected embodiments of the present disclosure. All other embodiments that can be obtained by those skilled in the art without creative efforts shall fall within the protection scope of the present disclosure.

It has been found that when a user watches the contents shared by other users through the community comment software or the E-book reading software, the user can only perform operations, such as commenting, forwarding, liking, collection and so on, on the shared contents, and the interaction manners are relatively simple; and if the user wants to know other contents related to the shared contents, the user needs to conduct search for the contents, the operation would be cumbersome and time consuming, and the efficiency of acquiring the information is low.

For example, a user a publishes a picture of a book that is being read by the user in an E-book reading software, and after a user b views the shared content published by the user a, the user b comments the shared content published by the user a, the comment content includes name of the book, and when a user c views the shared content published by the user a and the comment content published by the user b (hereinafter collectively referred to as interactive content), if the user c wants to obtain detailed contents of the book and information about other books written by the book author, the user c needs to search for the book name of the book and the author corresponding to the book, the operation is cumbersome and time-consuming, and the information acquisition efficiency is low.

The recognition of the existing defects as described above is obtained by the inventor after practice and careful research, therefore, the process of discovering the above-mentioned problems and the solutions proposed by the present disclosure for the above-mentioned problems as below should all belong to contributions made by the inventor to the present disclosure in the process of the present disclosure.

Based on the above-mentioned research, embodiments of the present disclosure provide an information presentation method and apparatus, and a computer storage medium, when at least one piece of interactive content is presented on a first page, the interactive content can comprise at least one target text element presented in a preset form, and the preset form is used for indicating quick acquisition of an associated resource of the target text element; after the target text element is triggered, a first introduction information of a first resource matching the target text element and a second introduction information of a second resource related to the target text element are acquired. That is, the user can directly acquire introduction information of the resources matching or being related to the target text element by triggering the target text element, so as to reduce information acquisition time and improve information acquisition efficiency.

It should be noted that like reference numerals and letters represent similar items in the following figures, therefore, once a certain item is defined in one figure, it is not necessary to further define and interpret it in the subsequent figures.

In order to facilitate understanding of embodiments of the present disclosure, firstly, an information presentation method disclosed in the embodiments of the present disclosure will be described in detail, an executive subject of the information presentation method provided in the embodiments of the present disclosure is generally a computing device having certain computing capability, and the computing device comprises, for example, a terminal device or server or any other processing device, the terminal device may be a user equipment (UE), a mobile device, a user terminal, a terminal, a personal digital assistant (PDA), a handheld device, a computing device, a vehicle-mounted device, a wearable device, and the like. In some possible implementations, the information presentation method may be implemented by invoking, by a processor, computer-readable instructions stored in a memory.

It should be noted that the embodiments of the present disclosure are applicable to presentation of any recommendation information, including but not limited to presentation of recommended books, presentation of recommended movie and television play works, presentation of recommended news media content, and the like, the term "target text element" in embodiments of the present disclosure may be name information of a related resource, for example, may comprise a book name, a movie name, a television play name, etc. The information presentation method involved in embodiments of the present disclosure can set the target text element in the interactive content to be presented in a preset form, thereby reminding the user to quickly acquire the associated resource of the target text element, and specifically, after the user triggers the target text element in the interactive content, the introduction information of the resource in the associated resources matching the target text element and the introduction information of the recommended other related resources can be presented.

The following describes the information presentation method in embodiments of the present disclosure by taking presentation of a recommended book as an example.

Embodiment 1

The following describes the information presentation method provided in the embodiments of the present disclosure by taking the executive subject as a terminal device as an example.

Referring to FIG. 1, which is a flowchart of an information presentation method according to an embodiment of the present disclosure, the method includes steps S101-S103, wherein:

S101, presenting at least one piece of interactive content on a first page, wherein the interactive content comprises at least one target text element presented in a preset form, and the preset form is used for indicating acquisition of an associated resource of the target text element.

Here, the first page may be any page that may present any interactive content, such as a topic page, a comment page, a book interactive recommendation page, and the like. The interactive content may be the content published by a user in an information sharing software, such as comment content, and the information sharing software may include various types of software, such as community comment type interactive software and E-book reading software.

The preset form may include at least one of Specific Font Color, Specific Background Color, Underline, Font Bold, and Character Amplification, and is used to remind the user that an associated resource of the target text element can be acquired, for example, the target text element is a book name, and the associated resource is a related book. Here, an manner of allowing the user to quickly acquire an associated resource is configuring an inner chain for the target text element, and the inner chain is used for linking to a second page presenting the first introduction information and the second introduction information; and the target text element may include at least one keyword, which, for example, may be a resource name such as a movie name, a book name, or may be a brief introduction or other attribute information such as an author of a related resource. Hereinafter, the contents of the embodiments of the present disclosure will be described by taking the foregoing information sharing software being the E-book reading software and the target text element being a book name as an example.

As an example, the target text element may contain pre-set contents, and be identified when presented on the page and presented in a preset form. As one example, when a target text element appears (e.g., user input) in the interactive content, the target text element is automatically identified (e.g., by an appropriate device such as a server, a terminal device, etc.) and presented in a preset form. As another example, when a target text element appears (e.g., a user input) in the interactive content, a particular target text element (e.g., a target text element at a particular location) may be manually identified (e.g., identified by the user), and set by the user to be presented in a preset form (e.g., in a touch screen operation mode, the user long presses the target text element to pop up a setup window for setting, of course, other appropriate setup mode may also be employed).

In a specific implementation, when at least one piece of interactive content is presented in the first page of the information sharing software (the interactive content can be any content that is published by the user and can be read by other users, such as comment content), the target text element in the interactive content can be presented in a preset form, so as to remind the user to quickly acquire the associated resource, after the target text element is triggered, the second page can be jumped to, introduction information of the resource matching the target text element can be presented, and introduction information of other recommended and related resources can be presented, and the specific description will refer to the following steps S102 to S103.

Figure 2:
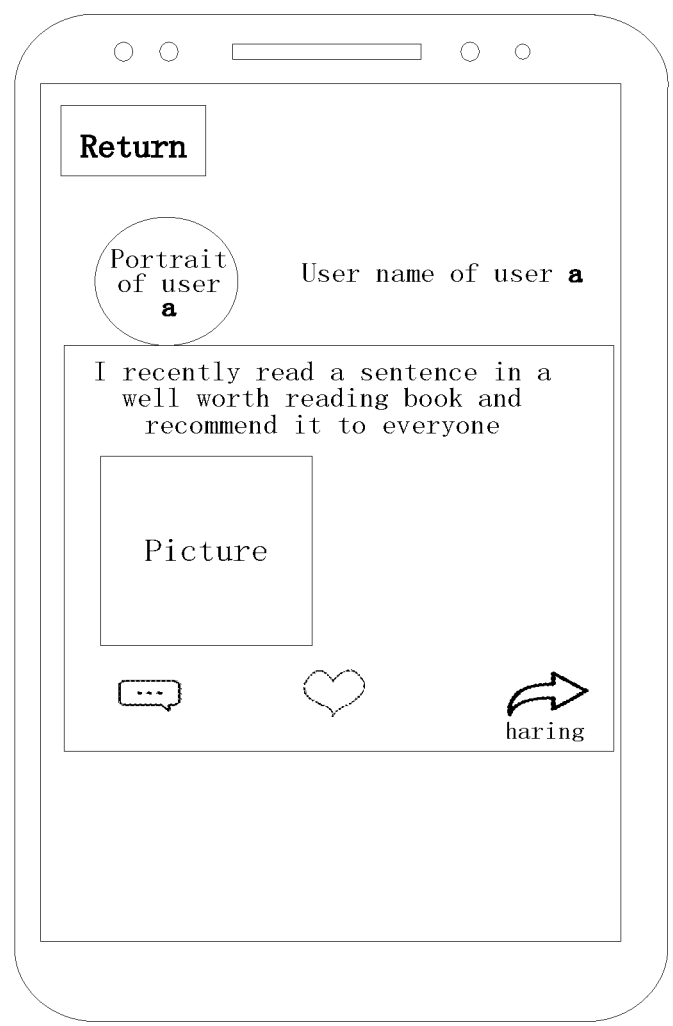
FIG. 2 shows a schematic diagram of a presentation interface of a first page in the information presentation method according to an embodiment of the present disclosure.

For example, if the user uses the E-book reading software to watch the recently read book content shared by other users, the user can acquire the interactive content including the book name presented in the preset form in the first page, and the specific presentation interface of the first page may be as shown in FIG. 2, and by taking a terminal device being an mobile phone as an example, the presentation interface can include: the shared content "I recently read a sentence in a well worth reading book and recommend it to everyone" published by the user a and a picture containing the sentence that user a wants to recommend to everyone, the user name of user a, the head portrait of user a, the comment content corresponding to the shared content published by user a, a comment touch button for instructing other users to comment on the shared content published by user a, a forward touch button for instructing other users to forward the shared content published by user a, and a collect touch button for instructing other users to collect the shared content published by user a, here, the comment content corresponding to the shared content published by user a includes three comment contents: comment content 1, comment content 2, and comment content 3, and the comment content 2 includes the book name presented with underline.

S102: in response to a trigger operation on the target text element, acquiring a first introduction information of a first resource matching the target text element and a second introduction information of a second resource related to the target text element.

The trigger operation may include at least one of a single click, a double click, and a long press, the first introduction information of the first resource may include a picture, title information, brief introduction information, etc. corresponding to the first resource; the introduction information of the second resource may include a picture and title information corresponding to the second resource, here, the picture may be a representative picture of the related resource, for example, the related resource is a book, and the corresponding picture may be a cover of the book, the title information may be the name of the related book, and the brief introduction information may be content introduction of the related book.

In a specific implementation, the first resource matches the target text element, which is specifically embodied as that the title information of the first resource may include at least one keyword in the target text element, and the second resource is related to the target text element, which is specifically embodied as that the second resource can have the same attribute information as the target text element in at least one preset attribute dimension, for example, the same author, the same genre, etc., and/or co-occurrence data of title information of the second resource and the target text element in historical interactive contents exceeds a preset threshold.

Here, the attribute information in the at least one preset attribute dimension may include an author, a genre (for example, a poem, a novel (specifically, may also be subdivided into Fantastical class, Science and Technology class, Love class, Martial Arts class, Entertainment classes, etc.), drama, essay), and the like. The co-occurrence data may include a co-occurrence number and/or a co-occurrence degree, the co-occurrence number may mean the number of times that both appear together, and the co-occurrence degree may mean a ratio of the number of times that both appear together and the total number of times that either appears.

In a specific implementation, the server may use a manner of calculating an editing distance for determining the first resource which matches the target text element, as seen the description on the server side below. For example, the editing distance between the target key information, such as title information, of the first resource and the target text element shall be less than a set threshold, where the editing distance belongs to a quantitative measurement for the degree of difference between two character strings, and the measurement manner is to check how many times of processing shall be performed to change one character string into another character string, that is, the least editing times required to change from one character string to another character string between the two character strings, and generally, the editing distance can characterize the degree of correlation between the two character strings, for example, the first resource can be deemed as a kind of resource whose correlation degree related to the target text element is larger than a set correlation degree, for example, when the title of the first resource is completely the same as the target text element, the corresponding editing distance is 0. In addition, considering that the display area is limited, when the first introduction information of the first resource is presented, only the first introduction information of the first resource, whose the corresponding editing distance is smaller than the set threshold and is within a preset number, can be selected for presentation.

In a specific implementation, after acquiring the first introduction information corresponding to the target text element and the second introduction information associated with the target text element based on step S102, the terminal device may present the acquired first introduction information and the second introduction information based on step S103, and the specific description will refer to the following step S103.

S103: presenting the first introduction information and the second introduction information on a second page.

In a specific implementation, in response to a trigger operation of the user on the target text element, the terminal device acquires first introduction information corresponding to the target text element, and second introduction information associated with the target text element, jumps to the second page from the first page presenting at least one interactive content, and the first introduction information and the second introduction information are presented in the second page.

When the first introduction information and the second introduction information are presented in the second page, the first introduction information and the second introduction information can be presented in different presentation manners, respectively.

For example, in the case that the first resource comprises a plurality of resources, and the second resource comprises a plurality of resources, the first introduction information of each of the first resources are respectively presented in a first area of the second page in a vertically arrangement, and the second introduction information of each of the second resources are respectively presented in a second area of the second page in a lateral arrangement, wherein the second introduction information can support lateral switching presentation.

Here, generally, the contents corresponding to the first introduction information is more than that of the second introduction information, and generally, the first introduction information may be presented in a vertically arranged manner, that is, only one column of first introduction information is presented in the screen.

In addition, generally, due to the limitation of the screen size of the terminal device, it may be impossible to present the first introduction information of all the first resources whose editing distances from the target text element are not less than the set threshold in the vertical arrangement, so that generally, a preset number of the first introduction information which are to be presented vertically will be preconfigured, so that in the second page, the preset number of first introduction information is presented in a vertical arrangement manner.

For example, if the target text element is the name of the book "FAN REN DENG SHEN DIAN", the first introduction information may include the introduction information of the book "FAN REN DENG SHEN DIAN", the introduction information of the book "FAN REN XIU SHEN ZHUAN", and the introduction information of the book "FAN REN XIU SHEN JI".

As described above, the second resource corresponding to the second introduction information presented in the second area includes resources having the same attribute information as that of the target text element in the at least one preset attribute dimension, such as the resources with the same author and similar genres, other than the first resource, and may further include resources that co-occurrence data of its title information and the target text element in historical interactive contents exceeds a preset threshold, for example, the times that they both appears in the user's comment contents exceed a preset threshold. Furthermore, if the number of the first resources whose corresponding editing distances from the target text element are smaller than a preset threshold is larger than a preset number, the first resources beyond the preset number may also be used as the second resource, and its corresponding introduction information can be presented in the second area as the second introduction information. Here, in first resources whose corresponding editing distances are less than the preset threshold, three first resources with the smallest corresponding editing distances are selected to be presented in the first region, and the other first resources are presented in the second area as the second resources.

Here, in the second page, the user may perform a left-right sliding operation in the second area, so as to realize lateral switching presentation of different second introduction information.

For example, for a case that the resource is a book, when the first introduction information is vertically arranged to be presented in the second page, the cover, the book name and the brief introduction information of the book corresponding to the book can be presented; and when the second introduction information is laterally arranged to be presented in the second page, the cover and the book name corresponding to the book can be presented.

In a specific implementation, the second page may be presented in form of a floating layer. In a specific presentation mode, each piece of first introduction information may be presented in form of an independent card, and all the second introduction information may be presented as a whole in form of a card. That is, in the first area of the second page, a plurality of first cards can be included, the number of the first cards matches with the number of the first resources, and the first introduction information is presented on the first cards respectively; and the second area of the second page can comprise a second card, and the second card can present multiple pieces of second introduction information.

Taking the associated resource being a book, the target text element being a book name, the first introduction information and the second introduction information being introduction information of the book as an example, in one embodiment, after the first introduction information and the second introduction information are presented in the second page, in response to a trigger operation on any piece of presented book introduction information, a reading page of the book corresponding to the book introduction information can be presented. That is, after the user confirms that there exists a reading requirement for a related book according to the introduction information of the related book, the user can directly trigger the relevant introduction information, and enter a reading page corresponding to the book in the reader.

In a specific implementation, after acquiring the first introduction information and the second introduction information based on the step S102, the terminal device can jump to the second page from the first page presenting the interactive content, and a search entry of target text element can be displayed in a third area of the second page, while the first introduction information and the second introduction information being presented on the second page.

Here, the search entry can include a prompt message indicating the user to conduct a search, and the prompt message can include a target text element, for example, if the target text element is the name of the book "FAN REN DENG SHEN DIAN", the display information corresponding to the search entry may be: "To search FAN REN DENG SHEN DIAN", and when the target text element is the name of a movie name of "Up in the wind", the display information corresponding to the search entry may be: "To search Up in the wind".

For example, when the target text element is the book name "FAN REN DENG SHEN DIAN", if the preset number is 2, the first introduction information acquired based on the step S102 comprises: introduction information of a book "FAN REN DENG SHEN DIAN" and introduction information of a book "FAN REN XIU SHEN ZHUAN", the acquired second introduction information comprises: introduction information of a book "FAN REN XIU HEN JI", introduction information of a book "FAN REN XIU XIAN JI", introduction information of a book "XIU XIAN ZHUAN", introduction information of a book "XIAN REN JIA DAO", and introduction information of a book "SHANG SHANG XIAN", after acquiring the first introduction information and the second introduction information, jumping from the first page to the second page, presenting the first introduction information in the first area of the second page, and presenting the second introduction information in the second area, presenting a search entry of the target text element in the third area, if the arrangement order of the acquired first introduction information (the arrangement order can be determined based on popularity, attention, the number of currently browsing people, and the degree of correlation between the first introduction information and the target text element corresponding to respective first introduction information) is the introduction information of the book "FAN REN DENG SHEN DIAN" and the introduction information of the book "FAN REN XIU SHEN ZHUAN", then sequentially presenting the introduction information of the book "FAN REN DENG SHEN DIAN" and the introduction information of the book "FAN REN XIU SHEN ZHUAN" in a vertical arrangement manner, and if the book "FAN REN XIU SHEN ZHUAN" in the acquired second introduction information is a book that the editing distance between its corresponding title information and the target text element is less than a set threshold, preferentially presenting the introduction information of the book "FAN SHEN XIU SHEN JI" in second area of the second page, and then presenting the second introduction information of the other books, such as introduction information of the book "FAN REN XIU XIAN JI", introduction information of the book "XIU XIAN JI", introduction information of the book "XIAN REN JIA DAO", introduction information of the book "SHANG SHANG XIAN", etc., and the user can perform left-right sliding in the second area so as to switch and present introduction information of different second resources.

Figure 3:
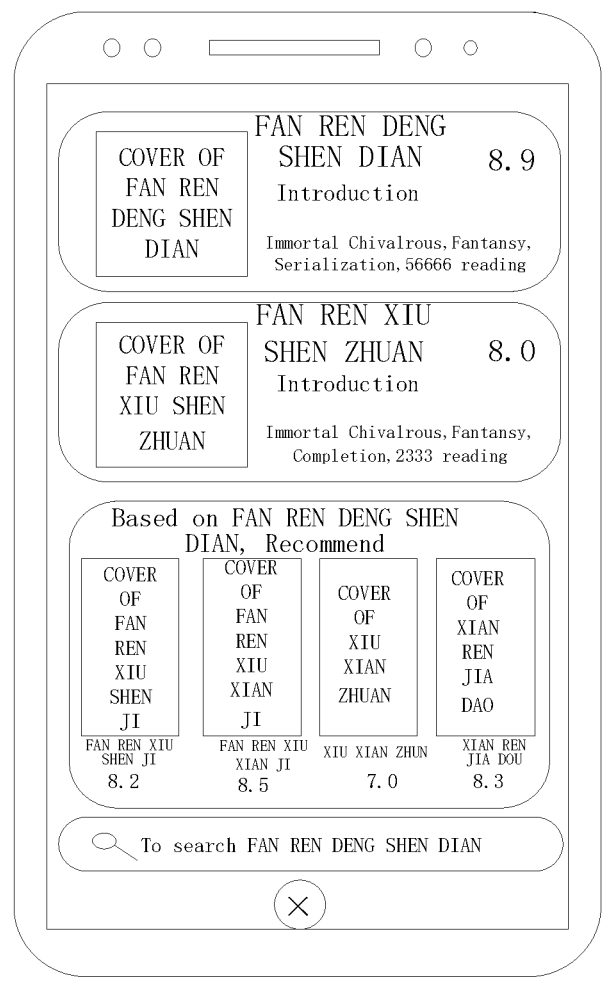
FIG. 3 shows a schematic diagram of a presentation interface of a second page in the information presentation method according to an embodiment of the present disclosure.
Figure 4:
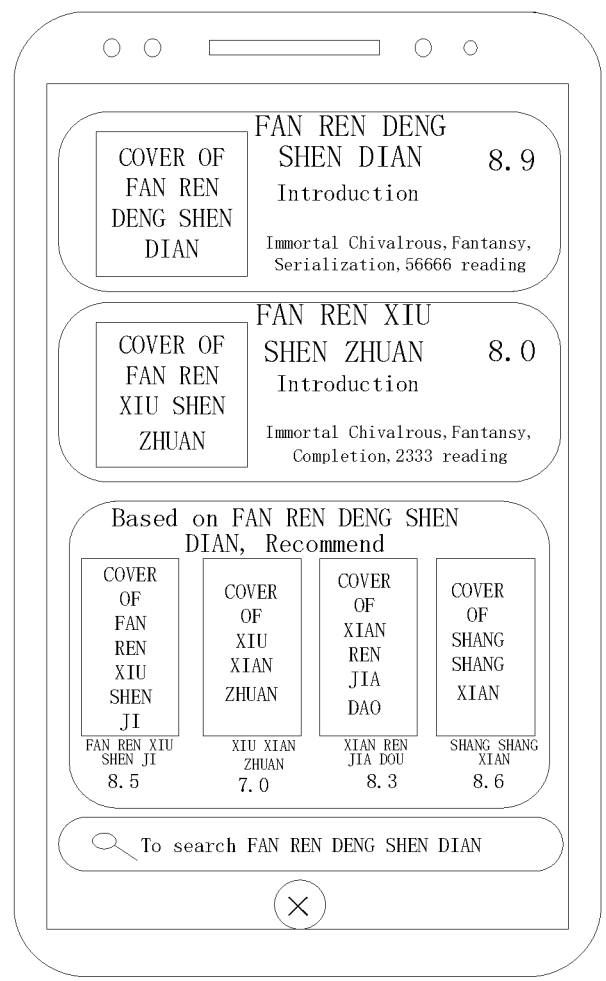
FIG. 4 shows a schematic diagram of another presentation interface of a second page in the information presentation method according to an embodiment of the present disclosure.

A specific presentation interface of the second page may be that as shown in FIG. 3, where by taking the terminal device being a mobile phone as an example, the presentation interface may include a cover, a book name: FAN REN DENG SHEN DIAN, book brief introduction information, a genre type (Immortal Chivalrous, Fantasy), book update state information: Serialization, the number of currently browsing people: 56666, and a score corresponding to the book: 8. 9 (here, the full score of the book is 10) corresponding to the book "FAN REN DENG SHEN DIAN" and a cover, a book name: FAN REN XIU SHEN ZHUAN, book brief introduction information, a genre type (Fantasy), book update state information: Complete, the number of currently browsing people: 2333, and a score corresponding to the book: 8. 0 (here, the full score of the book is 10) corresponding to the book "FAN REN XIU SHEN ZHUAN" presented in a vertical arrangement manner, and a cover, a book name: FAN REN XIU SHEN JI, and a score corresponding to the book: 8. 2 corresponding to the book "FAN REN XIU SHEN JI", and a cover, a book name: FAN REN XIU XIAN JI, and a score corresponding to the book: 8.5 corresponding to the book "FAN REN XIU XIAN JI", and a cover, a book name: XIU XIAN ZHUAN, and a score corresponding to the book: 7.0 corresponding to the book "XIU XIAN ZHUAN", and a cover, a book name: XIAN REN JIA DAO, and a score corresponding to the book: 8.3 corresponding to the book "XIAN REN JIA DAO" presented in a lateral arrangement manner, and a search entry of "To search FAN REN DENG SHEN DIAN", and a return touch button including return indication information (here, "x" may be used to characterize the return indication information), here, since generally the introduction information of at most four books can be laterally presented in the second area of the second page at the same time under the screen size constraint of the terminal device, the introduction information presented in the second area of the second page can be laterally switched by left-right sliding, and when the user slides the second area of the second page leftwards, the cover, the book name: SHANG SHANG XIAN, and the score 8.6 corresponding to the book "SHANG SHANG XIAN" are presented to the user, and the specific presentation interface of the second page in response to the sliding operation is specifically shown in FIG. 4, where the terminal device being a mobile phone is taken as an example.

In a specific implementation, the user may acquire a search result matching the target text element by triggering the search entry information, and specifically: after the user triggers the search entry information, the terminal device responds to the trigger operation for the search entry information and takes the target text element as the search target text content, searches a search result associated with the target text element through a search engine, and jumps to a third page from the second page presenting the first introduction information and the second introduction information, and displays the search result on the third page.

Where, both the third page and the first page and the second page belong to pages of the same application, for example, all are pages of an electronic reading software, the first page presents the target publishing content including the target text element bound with a jump link, the second page presents the first introduction information matching the target text element, and the second introduction information associated with the target text element, and the third page presents the search result, specifically by means of a webpage constructed based on Hyper Text Markup Language (HTML), that is, an HTML5 page.

Figure 5:
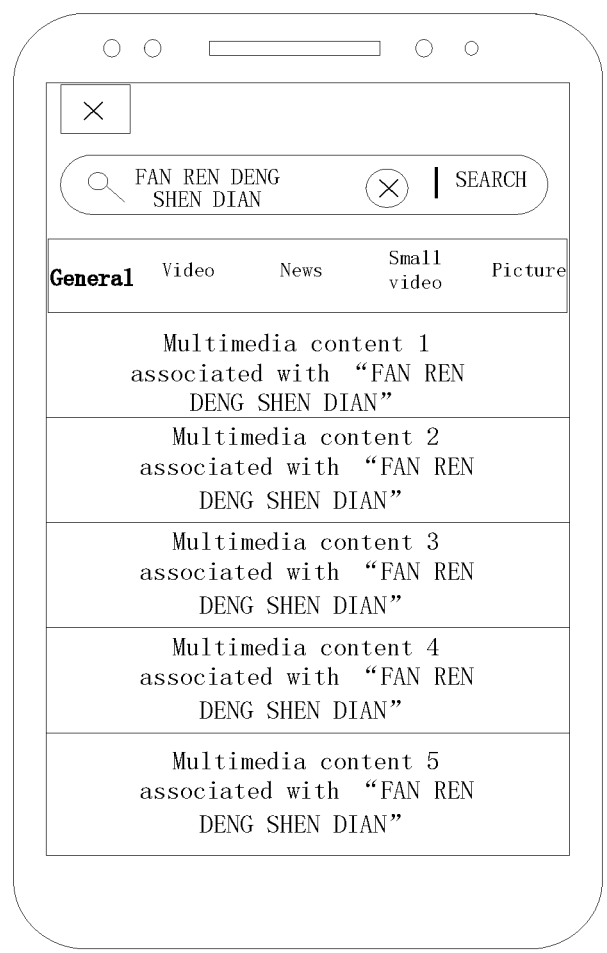
FIG. 5 shows a schematic diagram of a presentation interface of a third page in the information presentation method according to an embodiment of the present disclosure.

For example, if a user triggers a search entry "To search FAN REN DENG SHEN DIAN" in FIG. 3, the terminal device uses the target text element "FAN REN DENG SHEN DIAN" as the search target text content, obtains the search result associated with "FAN REN DENG SHEN DIAN" through the search engine, and presents the search result in the jumped third page, the specific presentation interface of the third page is as shown in FIG. 5, by taking the terminal device being a mobile phone as an example, the presentation interface may include "FAN REN DENG SHEN DIAN", a search touch button indicating user search, and a plurality of channels including a general channel, a video channel, an information channel, a small video channel, a picture channel, and the like, and a plurality of multimedia contents associated with "FAN REN DENG SHEN DIAN" included in a default channel "comprehensive" channel (here, by highlighting the "comprehensive" channel in a manner of adding color annotation to characterize the comprehensive channel as the default channel), and a return touch button.

In a specific implementation, the user may trigger any introduction information in the second page, and after the user triggered any introduction information presented in the second page, the terminal device responds to the trigger operation on the introduction information and presents a resource detail page associated with the introduction information. For the electronic reading software, that is, the reading page of a book corresponding to any one of the triggered book introduction information is presented.

Figure 6:
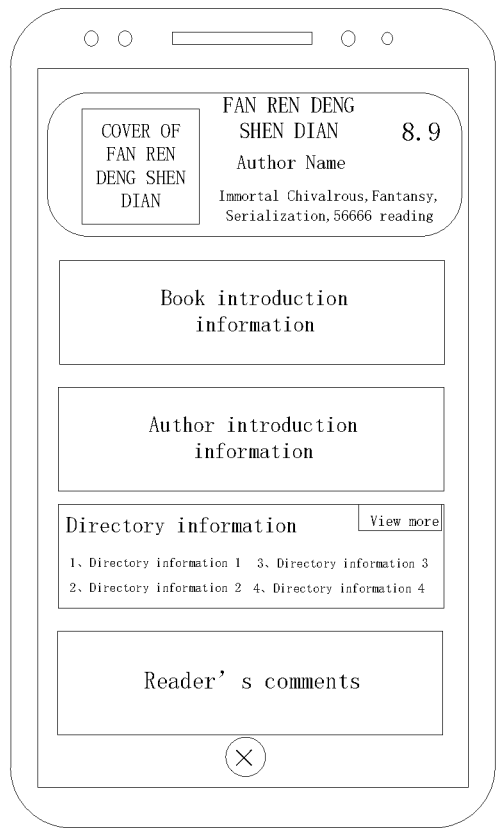
FIG. 6 shows a schematic diagram of a presentation interface of an entity information detail page in the information presentation method according to an embodiment of the present disclosure.

For example, if the user triggers the introduction information of the book "FAN REN DENG SHEN DIAN" presented in FIG. 3, the terminal device responds to the trigger operation on the introduction information, and displays reading pages of the book "FAN REN DENG SHEN DIAN", the specific reading page may be as shown in FIG. 6, and by taking the terminal device being a mobile phone as an example, the reading page presented first may include cover, book name: FAN REN DENG SHEN DIAN, an author name, brief introduction information, author introduction, directory information, and reader comment information corresponding to the book "FAN REN DENG SHEN DIAN", and a return touch area used for indicating the user to return (here, using "x" to represent user return operation prompt information), here, under the screen size constraint of the terminal device, generally, only several pieces of directory information would be presented, and indication information for instructing a user to view all directory information, and a touch button for viewing all directories can be set; FIG. 6 shows four pieces of directory information, and presents "view more" indication information for instructing a user to view all directories, and a touch button for viewing all directories; here, after any directory information is triggered by a user, a chapter corresponding to the book can be jumped to.

In the embodiments of the present disclosure, presenting at least one piece of interactive content on a first page, wherein the interactive content comprises at least one target text element presented in a preset form, and the preset form is used for indicating acquisition of an associated resource of the target text element, in response to a trigger operation on the target text element, acquiring a first introduction information of a first resource matching the target text element and a second introduction information of a second resource related to the target text element, and presenting the first introduction information and the second introduction information on a second page. Here, by presenting the target text element in the preset form, the user can be reminded to quickly acquire the associated resource related to the target text element, and after the target text element is triggered, the second page is jumped to, and in the second page, the relevant information of the first resource matching with the target text element is presented to the user, and concurrently, the relevant information of the second resource which is recommended, does not completely match but is associated with the target text element is presented to the user, so that the interactive manner between the user and the interactive contents can be increased, and the user can conveniently and quickly acquire the associated resource (for example, the target text element is a book name, and when the user requires to read a target book corresponding to the book name and/or read other books related to the book name, the user can trigger the book name so as to directly enter an introduction page of the related book, and further select whether to read the related book based on the relevant introduction information), thereby reducing information acquisition time and improving information acquisition efficiency.

The following describes the information presentation method according to the embodiments of the present disclosure by taking the execution body being a server as an example.

Figure 7:
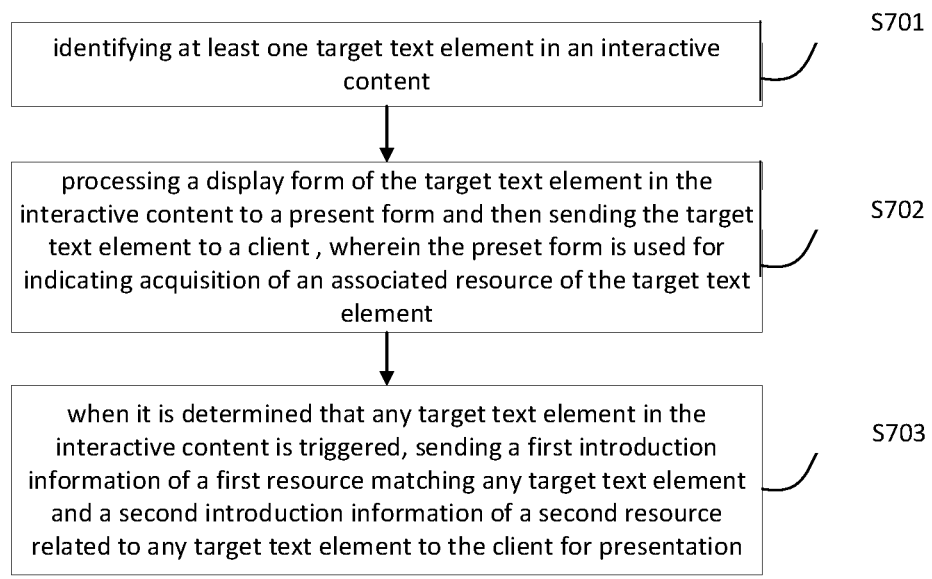
FIG. 7 shows a flowchart of another information presentation method according to an embodiment of the present disclosure.

Referring to FIG. 7, which is a flowchart of an information presentation method according to an embodiment of the present disclosure, the method includes steps S701-S703, wherein:

S701: identifying at least one target text element in an interactive content.

Taking an electronic reading software as an example, the target text element may include a book name, for example.

Figure 8:
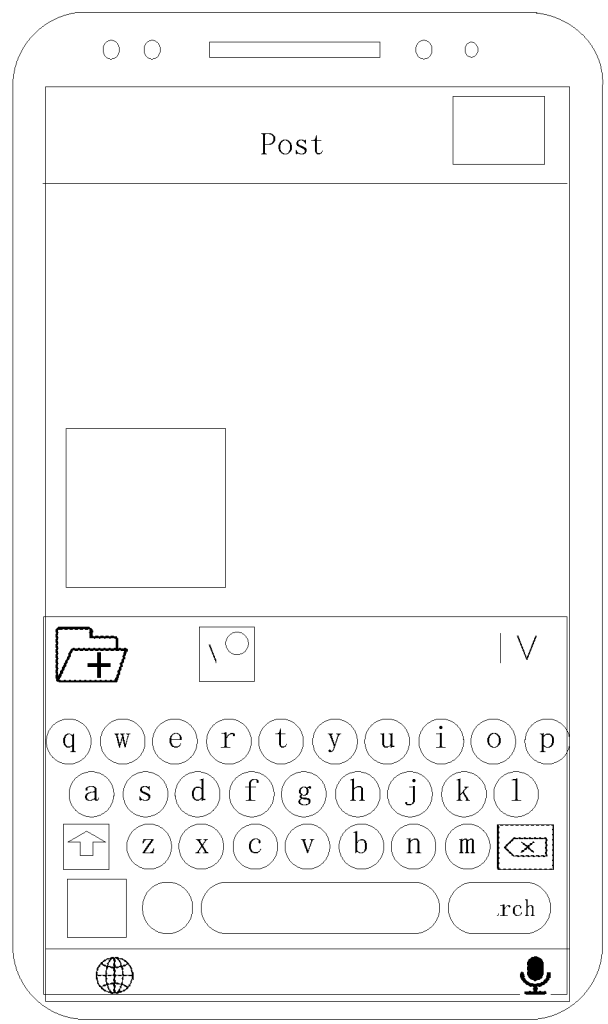
FIG. 8 shows a schematic diagram of a presentation interface of an editing page for the content to be published in another information presentation method according to an embodiment of the present disclosure.

The above interactive content may include content edited by the user on a to-be-published content editing interface, where the specific editing interface may be as shown in FIG. 8, and taking the terminal device being a mobile phone as an example, the editing interface includes interactive content input by the user: A hundred years to understand, A hundred years of loneliness. - - - <One Hundred Years of Solitude>, as well as a publish touch button indicating the user to publish, a return editing button for indicating the user to return, and an editing operation area, here, the editing operation area comprises an editing keyboard and a touch area for adding a picture (or a file or a video), here, the editing keyboard includes a shortcut button for adding a file, a shortcut button for adding a picture, and a shortcut button for adding a book name.

In a specific implementation, when the user inputs the interactive content on the editing interface, and clicks the publish touch button for publishing, the server obtains the interactive content, identifies a preset identifier in the interactive content, and determines the target text element in the to-be-published content based on location of the identified preset identifier.

For example, the preset identifier may be a book name.

For example, when the user inputs on the editing interface: A hundred years to understand, A hundred years of loneliness. - - - <One Hundred Years of Solitude>, and clicks the publish touch button for publishing, the server obtains the interactive content, identifies the book name in the interactive content, and uses the content in the book name as the target text element, that is, "One Hundred Years of Solitude" is used as the target text element.

S702: processing a display form of the target text element in the interactive content to a present form and then sending the target text element to a client, wherein the preset form is used for indicating acquisition of an associated resource of the target text element.

In a specific implementation, after the target text element in the interactive content published by the user is acquired based on step S701, the introduction information of the associated resource of the target text element may be determined, and the target text element is adjusted to a preset form, where the preset form herein may include at least one of Specific Font Color, Specific Background Color, Underline, Font Bold, and Character Amplification.

In addition, in order to implement quick acquisition of the associated resource, an inner chain is configured for the target text element, where the inner chain is used to link to the second page presenting the introduction information of the associated resource, and after the interactive content is published, and the target text element in the interactive content is triggered, the introduction information of the resource associated with the target text element may be presented on the second page that jumped to, with reference to the description of S703 in detail.

S703: when it is determined that any target text element in the interactive content is triggered, sending a first introduction information of a first resource matching any target text element and a second introduction information of a second resource related to any target text element to the client for presentation.

In a specific implementation, the first introduction information of the first resource matching any target text element and the second introduction information of the second resource related to the target text content may be determined in the following steps:

determining the first resource matching any target text element, and the second resource related to any target text content, extracting target key information from the first resource and the second resource respectively as the first introduction information and the second introduction information, wherein the target key information comprises at least one of a picture, a title, and a brief introduction.

In a specific implementation, when a first resource matching with any target text element is determined, an editing distance between target key information of a candidate resource and any target text element can be determined based on each character in the any target text element and each character in the target key information of the candidate resource; and a candidate resource with a corresponding editing distance that is less than a set value is selected as the first resource.

Here, for an electronic reading software, all book resources that can be provided by the server may be used as candidate resources. When the target text element is the book name, editing distances between the book name in the interactive content and the book names of the candidate books can be calculated, and candidate books with the corresponding editing distances smaller than the set threshold can be used as the first resources. In addition, if the preset number of first introduction information of the first resources that can be presented in the first area of the first page is less than the number of the obtained candidate books with the corresponding editing distances less than the set threshold, the preset number of candidate books with minimum editing distances can be selected from the obtained candidate books with the corresponding editing distances being less than the set threshold as the first resources, and the remaining candidate books can be presented in the second area of the second page as the second resources.

In a specific implementation, in addition to presenting the first introduction information of the first resources that cannot be presented in the first area in the second area as the second introduction information of the second resources, the second resources corresponding to the second introduction information presented in the second area may also be other associated resources recommended by the server, such as an attribute-related and/or user behavior-associated resources. Specifically, candidate resources having the same attribute information as the target text element in at least one preset attribute dimension (author, genre) may be determined as the second resources; and/or, co-occurrence data of title information of candidate resources and the target text element in historical interactive contents is acquired, and a candidate resource with a corresponding co-occurrence data that exceeds a preset threshold is selected as the second resource. The description that the attribute information is the same and the co-occurrence data exceeds the preset threshold can refer to the description on the terminal device side, and details are not given herein again.

In a specific implementation, in a case that there are a plurality of first resources and second resources, respective first resource may be sorted, and respective second resources may be sorted, they may be sorted according to their correlations with the target text element, and may also be sorted with reference to more dimensions, for example, the resources can be sorted according to popularity, which may be determined based on the number of browsing times, the number of attention people, the number of comments, etc., quality scores which can be determined based on user's rating, in combination with the correlations with the target text element which may be determined based on the editing distance, and the introduction information corresponding to the resources with higher popularity, higher quality score and higher correlation with the target text element can be arranged in front.

For example, if the target text element is the name of the book "FAN REN DENG SHEN DIAN", it is determined that the names of books whose editing distances from "FAN REN DENG SHEN DIAN" are less than a set threshold include "FAN REN DENG SHEN DIAN", "FAN REN XIU SHEN ZHUAN", and "FAN REN XIU SHEN JI", if the preset number is 2, and if the degree of popularity of the book "FAN REN DENG SHEN DIAN" is 98 (here, the popularity upper limit value is 100), the attention degree is 88 (here, the attention degree upper limit value is 100), and the degree of correlation between the target text element "FAN REN DENG SHEN DIAN" is 100%, if the degree of popularity of the book "FAN REN XIU SHEN ZHUAN" is 85 (here, the popularity upper limit value is 100), the attention degree is 88 (here, the attention degree upper limit value is 100), and the degree of correlation between the target text element "FAN REN DENG SHEN DIAN" is 90%, if the degree of popularity of the book "FAN REN XIU SHEN JI" is 80 (here, the popularity upper limit value is 100), the attention degree is 66 (here, the attention degree upper limit value is 100), and the degree of correlation between the target text element "FAN REN DENG SHEN DIAN" is 80%, according to corresponding degree of popularity, attention degree and degree of correlation between the target text element of respective sources, it is determined the arrangement orders of such three books can be "FAN REN DENG SHEN DIAN", "FAN REN XIU SHEN ZHUAN", and "FAN REN XIU SHEN JI", and if the preset number of the first introduction information presented in a vertical arrangement is 2, since the number of book names whose editing distance from the target text element is less than a set threshold, as determined above, is 3, the first two books in the arrangement order are selected, and their corresponding first introduction information including the book name, the cover, and the brief introduction is respectively presented in the first area of the second page, wherein each piece of first introduction information corresponds to one first card, and respective first card are vertically arranged in the first area.

Here, since the number of book names whose editing distance from the target text element is less than a set threshold, as determined above, is 3, which is larger than the preset number 2, the introduction information corresponding to the third book "FAN REN XIU SHEN JI" in the arrangement order is used as the second introduction information, and are presented in the second area together with the second introduction information of the other associated books (satisfying at least one of conditions that the author is the same, the genre is close, and the co-occurrence data exceeds the preset threshold value, wherein respective pieces of second introduction information are integrated into a second card to be presented in the second area which supports lateral switching presentation of respective second introduction information, that is, the second card may switch the presented second introduction information according to the left-right sliding operation of the user.

In a specific implementation, when it is determined that any one of the presented book introduction information is triggered, the book reading request sent by the client can be received, the reading page information of the book corresponding to the book introduction information is sent to the client, that is, the client jumps to the reading page of the book in the electronic reading software, and the user can start reading the book.

In this embodiment of the present disclosure, the server may identify at least one target text element in an interactive content, process a display form of the target text element in the interactive content to a present form and then send the target text element to a client, wherein the preset form is used for indicating quick acquisition of an associated resource of the target text element, in such a case, when it is determined that any target text element in the interactive content is triggered, send a first introduction information of a first resource matching any target text element and a second introduction information of a second resource related to any target text element to the client for presentation, thereby providing a way of quickly acquiring the associated resource for the user, for example, when the user reads the related book by using the electronic reading software, the reading page of the related book can be quickly located when the user reading an associated book name in the comment content, so that the reading efficiency of the user can be improved.

It shall be understood by those skilled in the art that, in the above-mentioned methods of specific embodiments, the expressed order of respective steps do not mean a strict execution order to constitute any limitation on the implementation process, and the specific execution sequence of respective steps should be determined by their functions and the possible internal logic.

Based on the same inventive concept, the embodiments of the present disclosure further provide an information presentation apparatus corresponding to the information presentation method. Since the principle of solving a problem by the apparatus in the embodiments of the present disclosure is similar to the information presentation method in the embodiments of the present disclosure, the implementation of the apparatus may refer to the implementation of the method, and details are not repeated herein again.

Figure 9:
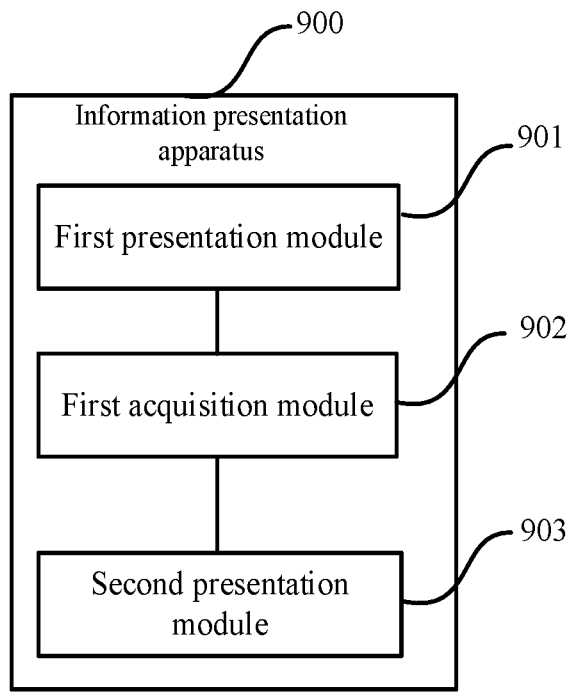
FIG. 9 shows a schematic diagram of an information presentation apparatus according to an embodiment of the present disclosure.

Referring to FIG. 9, which is a schematic diagram of an information presentation apparatus 900 according to an embodiment of the present disclosure, the apparatus includes: a first presentation module 901, a first acquisition module 902, and a second presentation module 903, where the first presentation module 901, configured to present at least one piece of interactive content on a first page, wherein the interactive content comprises at least one target text element presented in a preset form, and the preset form is used for indicating acquisition of an associated resource of the target text element;

the first acquisition module 902, configured to, in response to a trigger operation on the target text element, acquire a first introduction information of a first resource matching the target text element and a second introduction information of a second resource related to the target text element; and the second presentation module 903, configured to present the first introduction information and the second introduction information on a second page.

In the embodiments of the present disclosure, presenting at least one piece of interactive content on a first page, wherein the interactive content comprises at least one target text element presented in a preset form, and the preset form is used for indicating acquisition of an associated resource of the target text element, in response to a trigger operation on the target text element, acquiring a first introduction information of a first resource matching the target text element and a second introduction information of a second resource related to the target text element, and presenting the first introduction information and the second introduction information on a second page. Here, by presenting the target text element in the preset form, the user can be reminded to quickly acquire the associated resource related to the target text element, and after the target text element is triggered, the second page is jumped to, and in the second page, the relevant information of the first resource matching with the target text element is presented to the user, and concurrently, the relevant information of the second resource which is recommended, does not completely match but is associated with the target text element is presented to the user, so that the interactive manner between the user and the interactive contents can be increased, and the user can conveniently and quickly acquire the associated resource, thereby reducing information acquisition time and improving information acquisition efficiency.

In some embodiments of the present disclosure, the preset form comprises at least one of Specific Font Color, Specific Background Color, Underline, Font Bold, and Character Amplification, and the preset form of target text element is configured with an inner chain, and the inner chain is used for linking to a second page presenting the first introduction information and the second introduction information.

In some embodiments of the present disclosure, title information of the first resource comprises at least one keyword in the target text element, and the second resource has the same attribute information as the target text element in at least one preset attribute dimension, and/or co-occurrence data of title information of the second resource and the target text element in historical interactive contents exceeds a preset threshold.

In some embodiments of the present disclosure, the second presentation module 903 is specifically configured to present the first introduction information and the second introduction information on the second page in different presentation manners respectively.

In some embodiments of the present disclosure, the first resource comprises a plurality of resources, and the second resource comprises a plurality of resources, and the second presentation module 903 is specifically configured to respectively present the first introduction information of each of the first resources in a first area of the second page in a vertically arrangement, respectively present the second introduction information of each of the second resources in a second area of the second page in a lateral arrangement, wherein the second introduction information supports lateral switching presentation.

In some embodiments of the present disclosure, the first resource comprises a plurality of resources, and the second resource comprises a plurality of resources, and the second presentation module 903 is specifically configured to present the second page in form of a floating layer, a first area of the second page comprises a plurality of first cards, the number of the first cards is matched with the number of the first resources, and the first introduction information is presented in the first cards respectively; and a second area of the second page comprises a second card, and a plurality of pieces of the second introduction information are presented in the second card.

In some embodiments of the present disclosure, the associated resource is a book, the target text element is a book name, and the first introduction information and the second introduction information are introduction information of the book.

In some embodiments of the present disclosure, the apparatus further comprises a third presentation module, configured to, in response to a trigger operation for any presented book introduction information, present a reading page of a book corresponding to the any presented book introduction information.

In some embodiments of the present disclosure, the second presentation module 903 is specifically configured to: present a search entry of the target text element in a third area of the second page; acquire a search result corresponding to the target text element in response to a trigger operation on the search entry; and present the search result on a third page.

In some embodiments of the present disclosure, the first page, the second page, and the third page are pages of the same application.

Figure 10:
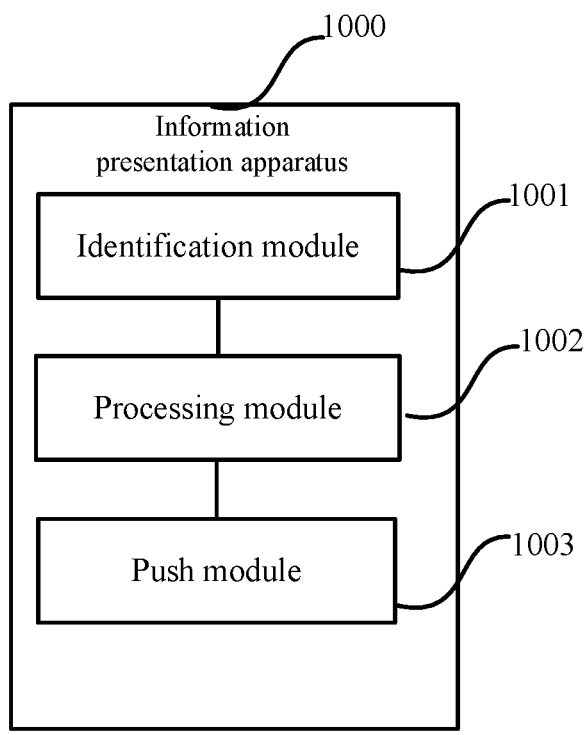
FIG. 10 shows a schematic diagram of another information presentation apparatus according to an embodiment of the present disclosure.

Referring to FIG. 10, which is a schematic diagram of an information presentation apparatus 1000 according to an embodiment of the present disclosure, the apparatus includes: an identification module 1001, a processing module 1002, and a push module 1003, where the identification module 1001, configured to identify at least one target text element in an interactive content, the processing module 1002, configured to process a display form of a target text element in the interactive content to a present form and then sent it to a client, wherein the preset form is used for indicating acquisition of an associated resource of the target text element;

the push module 1003, configured to, when it is determined that any target text element in the interactive content is triggered, send a first introduction information of a first resource matching any target text element and a second introduction information of a second resource related to any target text element to the client for presentation.

In some embodiments of the present disclosure, the identification module 1001 is specifically configured to:

identify a preset identifier in the interactive content; and
determine the target text element in the interactive content based on location of the identified preset identifier.

In some embodiments of the present disclosure, the apparatus further comprises a determination module configured to determine the first resource matching any target text element, and the second resource related to any target text content, extract target key information from the first resource and the second resource respectively as the first introduction information and the second introduction information, wherein the target key information comprises at least one of a picture, a title, and a brief introduction.

In some embodiments of the present disclosure, the determination module is specifically configured to determine an editing distance between target key information of a candidate resource and any target text element based on each character in the any target text element and each character in the target key information of the candidate resource; and take a candidate resource with a corresponding editing distance that is less than a set value as the first resource.

In some embodiments of the present disclosure, the determination module is specifically configured to determine a candidate resource having the same attribute information as the target text element in at least one preset attribute dimension as the second resource, and/or acquire co-occurrence data of title information of candidate resources and the target text element in historical interactive contents, and selecting a candidate resource with a corresponding co-occurrence data that exceeds a preset threshold as the second resource.

In this embodiment of the present disclosure, the server may identify at least one target text element in an interactive content, process a display form of the target text element in the interactive content to a present form and then send the target text element to a client, wherein the preset form is used for indicating quick acquisition of an associated resource of the target text element, in such a case, when it is determined that any target text element in the interactive content is triggered, send a first introduction information of a first resource matching any target text element and a second introduction information of a second resource related to any target text element to the client for presentation, thereby providing a way of quickly acquiring the associated resource for the user, for example, when the user reads the related book by using the electronic reading software, the reading page of the related book can be quickly located when the user reading an associated book name in the comment content, so that the reading efficiency of the user can be improved.

With respective to the description about the processing flow of each module in the apparatus and the interaction process between the modules, reference may be made to the related description in the foregoing method embodiments, and details are not repeated in detail herein.

Figure 11:
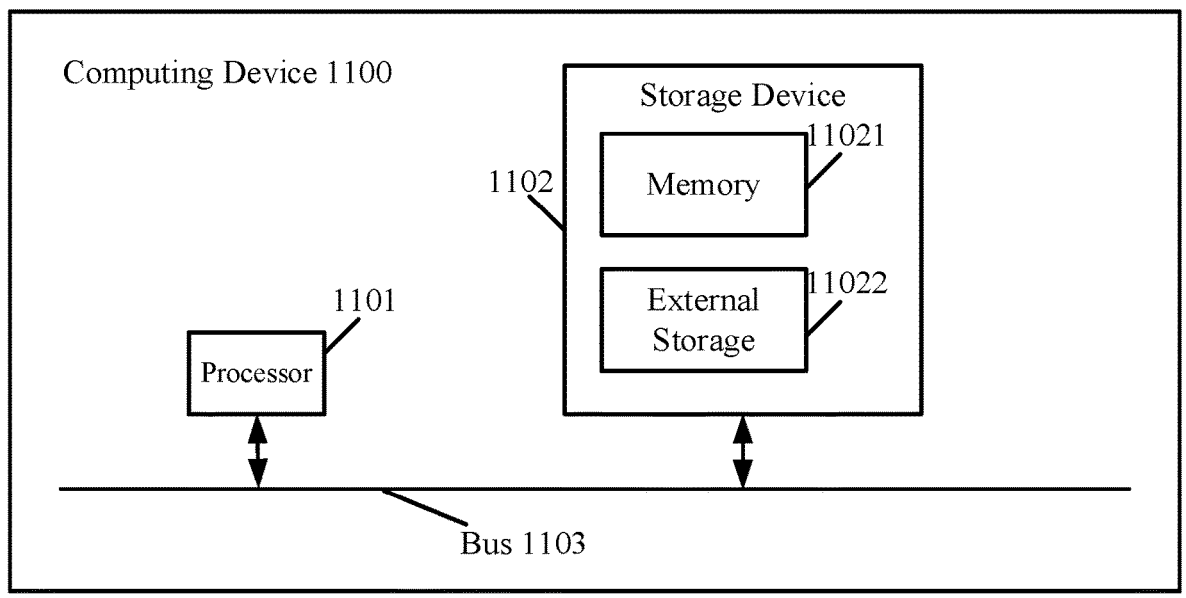
FIG. 11 shows a schematic diagram of a computing device according to an embodiment of the present disclosure.

Based on the same technical concept, an embodiment of this application further provides a computing device. Referring to FIG. 11, which is a schematic structural diagram of a computing device 1100 according to an embodiment of the present disclosure, the computing device 1100 includes a processor 1101, a storage device 1102, and a bus 1103. Where, the storage device 1102 is configured to store executable instructions, and includes a memory 11021 and an external storage 11022, here, the memory 11021 can also be referred to as internal storage, which is used to temporary store operational data in the processor 1101, as well as data switched between the external storage 11022 such as disk, etc., the processor 1101 switches data between the external storage 11022 via the memory 11021, when the computing device 1100 runs, the processor 1101 communicates with the storage device 1102 through the bus 1103, so that the processor 1101 executes the following instructions:

presenting at least one piece of interactive content on a first page, wherein the interactive content comprises at least one target text element presented in a preset form, and the preset form is used for indicating acquisition of an associated resource of the target text element, in response to a trigger operation on the target text element, acquiring a first introduction information of a first resource matching the target text element and a second introduction information of a second resource related to the target text element, and presenting the first introduction information and the second introduction information on a second page.

Alternatively, the processor 1101 executes the following instructions:

identifying at least one target text element in an interactive content, processing a display form of the target text element in the interactive content to a present form and then sending the target text element to a client, wherein the preset form is used for indicating acquisition of an associated resource of the target text element;

when it is determined that any target text element in the interactive content is triggered, sending a first introduction information of a first resource matching any target text element and a second introduction information of a second resource related to any target text element to the client for presentation.

Where, the specific processing flow of the processor 1101 may refer to the descriptions of the foregoing method embodiments, and the details are not described herein again.

An embodiment of the present disclosure further provides a computer readable storage medium, wherein the computer readable storage medium stores a computer program, and the computer program, when executed by the processor, executes the steps of the information presentation method in the foregoing method embodiments. The storage medium may be a volatile or non-volatile computer-readable storage medium.

An embodiment of the present disclosure further provides a computer program product, wherein the computer program product carries program codes, instructions included in the program codes may be used to perform the steps of the information presentation method in the foregoing method embodiment, as seen in the foregoing method embodiments, and details are not repeated herein again.

The computer program product may be specifically implemented by hardware, software, or a combination thereof. In an optional embodiment, the computer program product is specifically embodied as a computer storage medium, and in another optional embodiment, the computer program product is specifically embodied as a software product, such as a software development kit (SDK), etc.

It can be clearly understood by those skilled in the art that for the convenience and conciseness of description, the specific working processes of the system and apparatus described above can refer to corresponding processes in the aforementioned method embodiment, and will not be repeated here. In several embodiments provided by this disclosure, it should be understood that the disclosed system, apparatus and method can be realized in other ways. The apparatus embodiments described above are only schematic, for example, the division of the units is only a kind of logical function division, and there may be another division method in actual implementation. For example, multiple units or components may be combined or integrated into another system, or some features may be ignored or not implemented. On the other hand, the displayed or discussed mutual coupling or direct coupling or communication connection shown or discussed can be indirect coupling or communication connection via some communication interfaces, apparatus or units, which can be in electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present disclosure may be integrated into one processing unit, or each unit may exist physically alone, or two or more units may be integrated into one unit.

If the functions are realized in the form of software functional units and sold or used as independent products, they can be stored in a processor-executable non-volatile computer-readable storage medium. Based on this understanding, the technical solution of the present disclosure can be embodied in the form of a software product, which is stored in a storage medium and includes several instructions to make a computing device (which can be a personal computer, a server, a network device, etc.) execute all or part of the steps of the method described in various embodiments of the present disclosure. The aforementioned storage media include: U disk, mobile hard disk, Read-Only Memory (ROM), Random Access Memory (RAM), magnetic disk or optical disk and other media that can store program codes.

Finally, it should be explained that the above-mentioned embodiments are only specific embodiments of the disclosure, which are used to illustrate the technical scheme of the disclosure, but not to limit it. The protection scope of the disclosure is not limited to this. Although the disclosure has been described in detail with reference to the above-mentioned embodiments, it should be understood by ordinary people in the field that any person familiar with the technical field can still modify or easily think of changes to the technical scheme recorded in the above-mentioned embodiments within the technical scope of the disclosure, however, these modifications, changes or substitutions do not make the essence of the corresponding technical scheme deviate from the spirit and scope of the technical scheme of the embodiment of this disclosure, and should be included in the protection scope of this disclosure. Therefore, the scope of protection of this disclosure should be based on the scope of protection of the claims.

What is claimed is:

1. An information presentation method, comprising:
presenting at least one piece of interactive content on a first page, wherein the interactive content comprises at least one target text element presented in a preset form, and the preset form is used for indicating acquisition of an associated resource of the target text element;
in response to a trigger operation on the target text element, acquiring a first introduction information of a first resource matching the target text element and a second introduction information of a second resource which does not completely match but is related to the target text element; and
presenting the first introduction information and the second introduction information on a second page,
wherein title information of the first resource comprises at least one keyword in the target text element, and
wherein the second resource has the same attribute information as the target text element in at least one preset attribute dimension.

2. The method of claim 1, wherein the preset form comprises at least one of Specific Font Color, Specific Background Color, Underline, Font Bold, and Character Amplification, and the preset form of target text element is configured with an inner chain, and the inner chain is used for linking to a second page presenting the first introduction information and the second introduction information.

3. The method of claim 1, wherein
co-occurrence data of title information of the second resource and the target text element in historical interactive contents exceeds a preset threshold.

4. The method of claim 1, wherein the presenting the first introduction information and the second introduction information on a second page comprises:
on the second page, presenting the first introduction information and the second introduction information in different presentation manners respectively.

5. The method of claim 4, wherein the first resource comprises a plurality of resources, and the second resource comprises a plurality of resources, and the presenting the first introduction information and the second introduction information in different presentation manners respectively, comprising:
respectively presenting the first introduction information of each of the first resources in a first area of the second page in a vertically arrangement,
respectively presenting the second introduction information of each of the second resources in a second area of the second page in a lateral arrangement, wherein the second introduction information supports lateral switching presentation.

6. The method of claim 4, wherein the first resource comprises a plurality of resources, and the second resource comprises a plurality of resources, and the presenting the first introduction information and the second introduction information in different presentation manners respectively, comprising:
presenting the second page in form of a floating layer,
a first area of the second page comprises a plurality of first cards, the number of the first cards is matched with the number of the first resources, and the first introduction information is presented in the first cards respectively; and
a second area of the second page comprises a second card, and a plurality of pieces of the second introduction information are presented in the second card.

7. The method of claim 1, further comprising:
presenting a search entry of the target text element in a third area of the second page;
acquiring a search result corresponding to the target text element in response to a trigger operation on the search entry; and
presenting the search result on a third page.

8. A computing device, comprising: a processor and a memory, wherein the memory stores machine-readable instructions executable by the processor, and the machine-readable instructions when executed by the processor, cause the processor to execute operations comprising:
presenting at least one piece of interactive content on a first page, wherein the interactive content comprises at least one target text element presented in a preset form, and the preset form is used for indicating acquisition of an associated resource of the target text element;
in response to a trigger operation on the target text element, acquiring a first introduction information of a first resource matching the target text element and a second introduction information of a second resource which does not completely match but is related to the target text element; and
presenting the first introduction information and the second introduction information on a second page,
wherein title information of the first resource comprises at least one keyword in the target text element, and
wherein the second resource has the same attribute information as the target text element in at least one preset attribute dimension.

9. The computing device of claim 8, wherein the preset form comprises at least one of Specific Font Color, Specific Background Color, Underline, Font Bold, and Character Amplification, and the preset form of target text element is configured with an inner chain, and the inner chain is used for linking to a second page presenting the first introduction information and the second introduction information.

10. The computing device of claim 8, wherein
co-occurrence data of title information of the second resource and the target text element in historical interactive contents exceeds a preset threshold.

11. The computing device of claim 8, wherein the presenting the first introduction information and the second introduction information on a second page comprises:
on the second page, presenting the first introduction information and the second introduction information in different presentation manners respectively.

12. The computing device of claim 11, wherein the first resource comprises a plurality of resources, and the second resource comprises a plurality of resources, and
the presenting the first introduction information and the second introduction information in different presentation manners respectively, comprising:
respectively presenting the first introduction information of each of the first resources in a first area of the second page in a vertically arrangement,
respectively presenting the second introduction information of each of the second resources in a second area of the second page in a lateral arrangement, wherein the second introduction information supports lateral switching presentation.

13. The computing device of claim 11, wherein the first resource comprises a plurality of resources, and the second resource comprises a plurality of resources, and the presenting the first introduction information and the second introduction information in different presentation manners respectively, comprising:

presenting the second page in form of a floating layer, a first area of the second page comprises a plurality of first cards, the number of the first cards is matched with the number of the first resources, and the first introduction information is presented in the first cards respectively; and a second area of the second page comprises a second card, and a plurality of pieces of the second introduction information are presented in the second card.

14. The computing device of claim 8, wherein the machine-readable instructions, when executed by the processor, cause the processor to further execute operations comprising:

presenting a search entry of the target text element in a third area of the second page;

acquiring a search result corresponding to the target text element in response to a trigger operation on the search entry; and presenting the search result on a third page.

15. A non-transitory computer-readable storage medium storing a computer program thereon, and the computer program, when executed by a computing device, causes the computing device to execute operations comprising:

presenting at least one piece of interactive content on a first page, wherein the interactive content comprises at least one target text element presented in a preset form, and the preset form is used for indicating acquisition of an associated resource of the target text element;

in response to a trigger operation on the target text element, acquiring a first introduction information of a first resource matching the target text element and a second introduction information of a second resource which does not completely match but is related to the target text element; and presenting the first introduction information and the second introduction information on a second page, wherein title information of the first resource comprises at least one keyword in the target text element, and wherein the second resource has the same attribute information as the target text element in at least one preset attribute dimension.

16. The non-transitory computer-readable storage medium of claim 15, wherein co-occurrence data of title information of the second resource and the target text element in historical interactive contents exceeds a preset threshold.

17. The non-transitory computer-readable storage medium of claim 15, wherein the presenting the first introduction information and the second introduction information on a second page comprises:

on the second page, presenting the first introduction information and the second introduction information in different presentation manners respectively.

18. The non-transitory computer-readable storage medium of claim 17, wherein the first resource comprises a plurality of resources, and the second resource comprises a plurality of resources, and the presenting the first introduction information and the second introduction information in different presentation manners respectively, comprising:

respectively presenting the first introduction information of each of the first resources in a first area of the second page in a vertically arrangement, respectively presenting the second introduction information of each of the second resources in a second area of the second page in a lateral arrangement, wherein the second introduction information supports lateral switching presentation.

19. The non-transitory computer-readable storage medium of claim 17, wherein the first resource comprises a plurality of resources, and the second resource comprises a plurality of resources, and the presenting the first introduction information and the second introduction information in different presentation manners respectively, comprising:

presenting the second page in form of a floating layer, a first area of the second page comprises a plurality of first cards, the number of the first cards is matched with the number of the first resources, and the first introduction information is presented in the first cards respectively; and a second area of the second page comprises a second card, and a plurality of pieces of the second introduction information are presented in the second card.

20. The non-transitory computer-readable storage medium of claim 15, wherein the computer program, when executed by the processor, causes the computing device to further execute operations comprising:

presenting a search entry of the target text element in a third area of the second page;

acquiring a search result corresponding to the target text element in response to a trigger operation on the search entry; and presenting the search result on a third page.

\* \* \* \* \*